Figure 1:
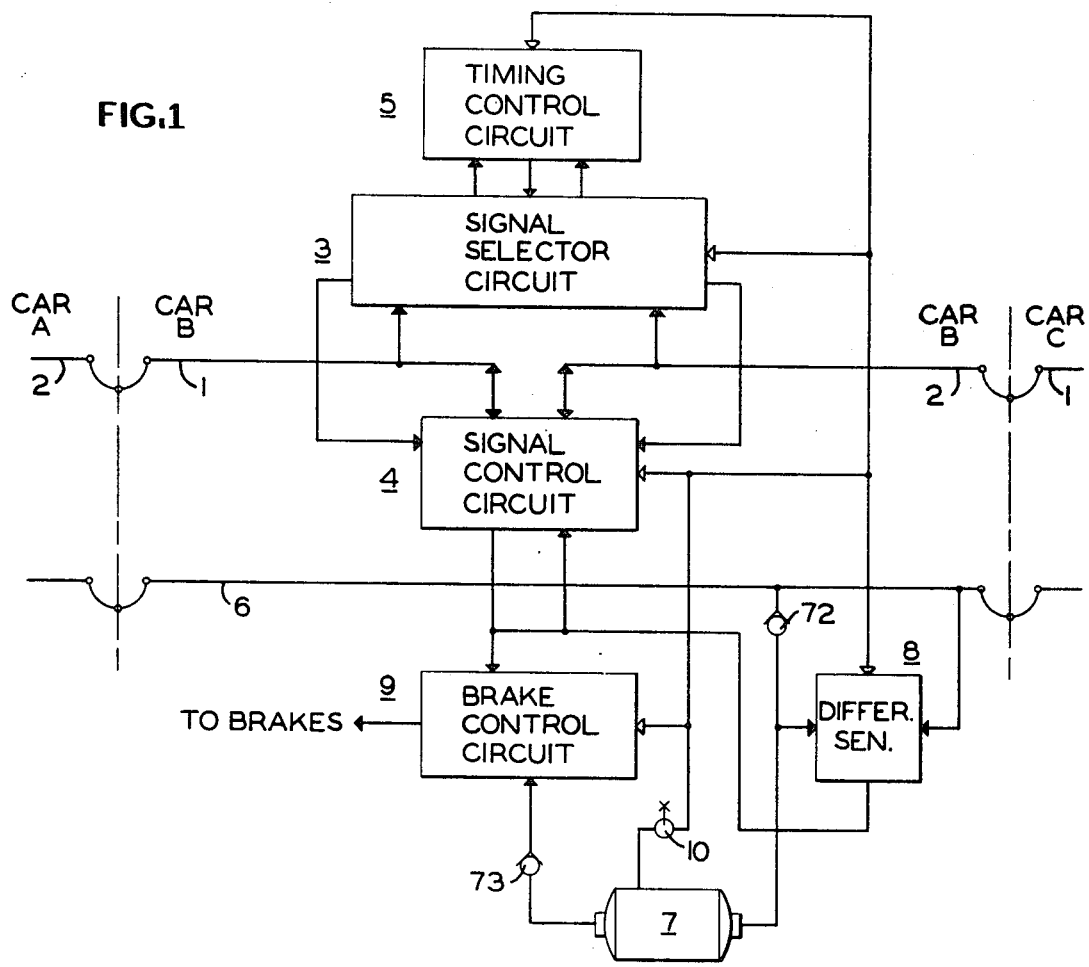

United States Patent
Sarbach

[15] 3,659,903
[45] May 2, 1972

[54] POWER AND BRAKE CONTROL SYSTEM UTILIZING FLUIDIC LOGIC ELEMENTS

[72] Inventor: Ronald A. Sarbach, Columbus, Ohio
[73] Assignee: Westinghouse Air Brake Company, Wilmerding, Pa.
[22] Filed: Sept. 29, 1970
[21] Appl. No.: 76,538

[52] U.S. Cl.................................303/20, 303/66, 303/86
[51] Int. Cl..................B60t 13/70, B60t 17/06, B60t 11/26
[58] Field of Search................303/20, 25, 35, 43, 66, 82, 303/86; 235/200 R, 200 PF, 201

[56] References Cited

UNITED STATES PATENTS

| 3,180,695 | 4/1965 | McClure | 303/86 |
| 3,232,677 | 2/1966 | Wilson et al. | 303/66 |
| 3,265,448 | 8/1966 | Newell | 303/86 |

Primary Examiner—Milton Buchler
Assistant Examiner—Stephen G. Kunin
Attorney—Ralph W. McIntire, Jr.

[57] ABSTRACT

A fluidic signal control system is provided on each car of a railway train for controlling braking thereof in accordance with variation of fluid pressure in a signal pipe extending through the train. An interlock valve device intermediately positioned in the signal pipe separates the signal pipe into segments terminating at opposite ends of the car. Signal selector circuitry responsive to variation of fluid pressure in each signal pipe segment selects the segment in which the incoming signal is being received as the "controlling" segment and establishes the other segment as the "controlled" segment via which the outgoing signal is propagated irrespective of the direction from which the signal is received. The interlock valve device is positioned in accordance with digital pilot signals provided by the signal selector circuit to direct fluid pressure in the "controlling" signal pipe segment to a proportional amplifier means which reinforces the control signal locally for control of a brake control circuit on each car and for connection by the interlock valve to the "controlled" signal pipe segment for transmission to the next car. A timing control circuit is included to momentarily disable the portion of the signal selector circuit responsive to fluid pressure variation in the "controlled" signal pipe segment to assure that the transmitted signal is not falsely sensed as a signal being received.

19 Claims, 3 Drawing Figures

Patented May 2, 1972

3,659,903

2 Sheets-Sheet 1

INVENTOR.
RONALD A. SARBACH
BY Ralph W. McIntire, Jr.
ATTORNEY

INVENTOR.
RONALD A. SARBACH

BY Ralph W. McIntire, Jr.

ATTORNEY

POWER AND BRAKE CONTROL SYSTEM UTILIZING FLUIDIC LOGIC ELEMENTS

BACKGROUND OF INVENTION

Railroad braking systems have traditionally utilized a train-lined pipe, commonly called a brake pipe, in which high fluid pressure is carried for producing the high brake forces required in railway operations, as well as for providing signal control for varying the degree of desired braking pressure. Brake pipe leakage, which is evident to varying degrees on all trains, causes a pressure gradient along the train-line from the front where higher brake forces are attained on cars near the head of the train from where the control of fluid pressure in the brake pipe is initiated to the rear, resulting in non-uniform brake forces. This problem is compounded by the effect of brake pipe friction, which may be defined as the impedance or resistance to fluid pressure flow in the brake pipe. Due to the high brake pipe pressure and the fact that the signal must travel through the entire length of pipe when variation of fluid pressure therein is made, in accordance with a brake control function, response times become adversely affected. Train lengths are thus limited by the speed of response and uniformity of brake application and release which will permit effective control of the train.

SUMMARY OF INVENTION

It is therefore the principle object of the present invention to provide a brake control system in which the functions of propagating the brake control signal and providing high fluid pressure supply to the brakes are divorced.

It is an extension of the above object to provide a signal control circuit in which the function of propagating the brake control signal is realized by utilizing low fluid pressure as the signal control medium and by including means for locally reinforcing the low fluid pressure control signal.

It is another object of the invention to provide a signal control circuit adapted to respond to an incoming control signal from either end of the vehicle, and to reproduce the incoming signal for propagation to the next car.

It is an extension of the above object to provide timing means for conditioning the signal control circuit to be non-responsive to outgoing control signals for a predetermined duration following termination of the incoming control signal.

It is yet another object of the invention to provide a brake control system adapted to produce an emergency brake control signal on each car when a train break-in-two occurs to override the normal brake control signal effective at the time.

In briefly describing the brake control system in the present invention, a pure fluid signal selector circuit is provided with means for sensing variations of signal pressure in each of a pair of signal pipe segments associated with opposite ends of a railway vehicle. Provided in the signal selector circuit is a pair of identical signal recognition networks, each including a Schmitt Trigger pair and logic elements through which the Schmitt Trigger outputs act to set a first flip-flop element common to the respective recognition networks in accordance with whichever one of the signal pipe segments is sensed as the "controlling" segment by reason of receiving an incoming signal. The "controlling" signal pipe segment is selected to be the segment in which signal pressure variation first occurs with the other signal pipe segment being considered the "controlled" segment. The Schmitt Trigger pair in each recognition network is arranged to respond to either increasing or decreasing signal pipe pressure. Also in the signal selector circuit is a second flip-flop element having its outputs, each of which are connected to a respective one of the recognition networks, pressurized in response to the set condition of the first flip-flop. The outputs of the second flip-flop act through the logic elements in the recognition networks to disable the recognition network associated with the "controlled" signal pipe segment so that the outgoing signal being propagated is not recognized as an incoming signal.

The power port of the second flip-flop is provided with a source of fluid pressure controlled in a digital manner by a timing control circuit. An OR element in the timing control circuit is responsive to the output of a logic element in the recognition network associated with whichever signal pipe segment is "controlling" to thereby initiate a timing function the duration of which is based upon the duration the signal pressure change in the "controlling" signal pipe segment has occurred. For the duration of the timing function, a NOR element in the timing control circuit is adapted to supply fluid pressure to the power port of the second flip-flop which is thereby activated to disable the recognition network associated with the "controlled" signal pipe segment. When the timing period expires, the function of the second flip-flop is suppressed by reason of its power supply being cut off and the previously disabled recognition network is restored to an active condition.

Also provided in the brake control system is an interlock valve device positioned in response to the outputs of the first flip-flop for connecting signal pressure in the "controlling" signal pipe segment to proportional amplifier means. One output of the amplifier varies inversely with variation of signal pressure, being connected to a brake control circuit to produce "fail-safe" proportional brake control on the car and the other output varies in direct proportion to signal pressure, being connected via the interlock valve to the "controlled" signal pipe segment for transmitting the brake control signal to the adjoining car. Since the recognition network associated with the "controlled" signal pipe segment is disabled during signal transmission, the signal selector circuit is unable to respond to signal pressure variation in the "controlled" signal pipe segment, but remains conditioned to respond to subsequent signal pressure variations in either one of the signal pipe segments upon completion of the outgoing signal transmission.

In addition to the signal pipe, each car is provided with a power pipe which carries high fluid pressure for supply to the brake cylinder in accordance with the degree of brake application called for by variation of fluid pressure in the signal pipe. Due to the low fluid pressure carried in the signal pipe, leakage therein is substantially reduced. For this reason and because signal pressure is locally reinforced at each car so that only a minimum of resistance to fluid flow is encountered in response to variation of signal pressure, a more consistent fluid pressure signal is effectively propagated via the signal pipes on each car of the train whereby the advantages of uniform brake control and fast response are realized.

Figure 3:
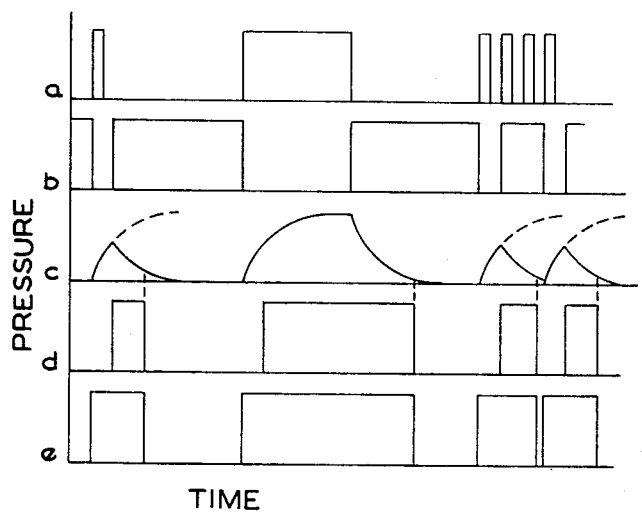
Figure 2:
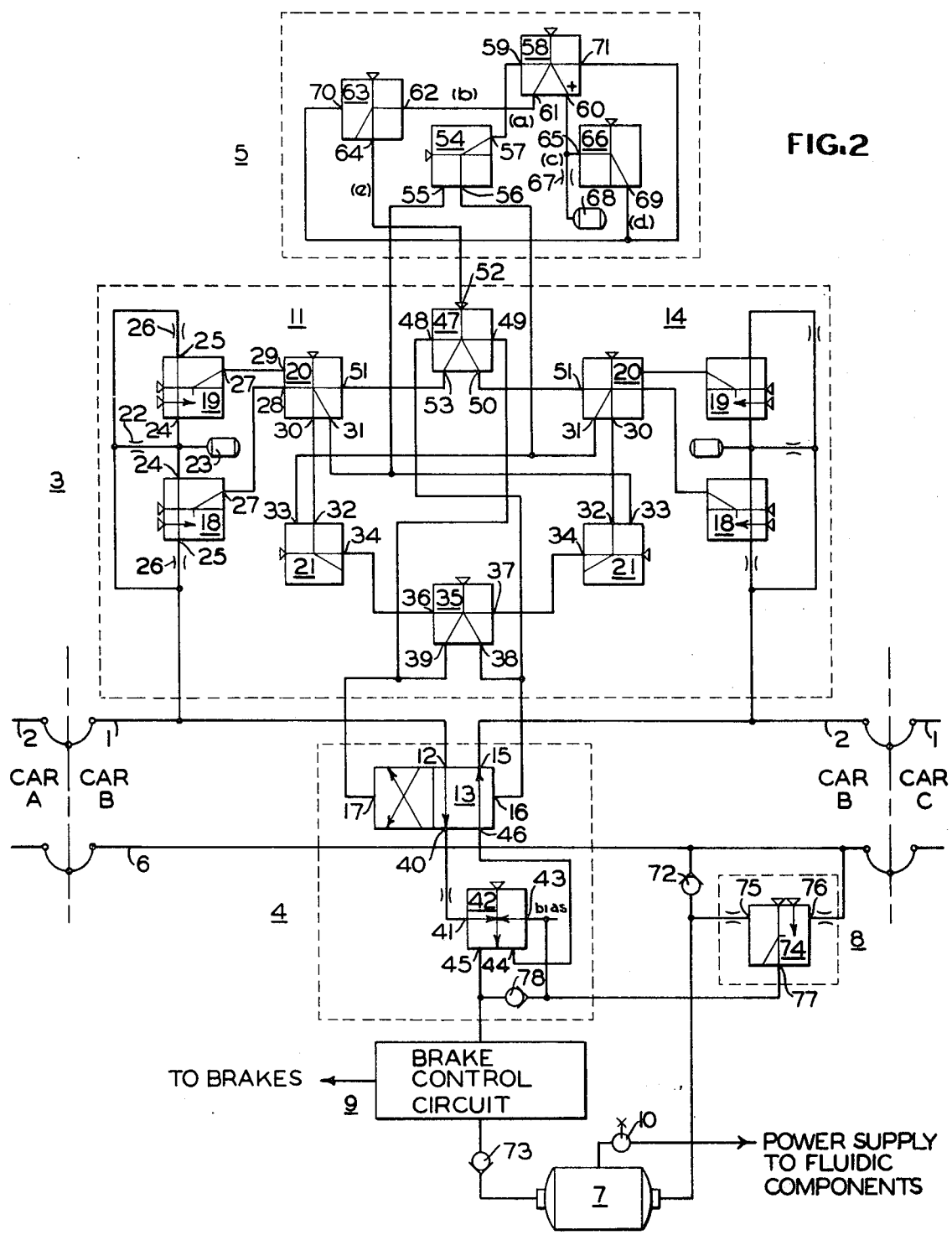

A more complete understanding of the invention will be realized from the following more detailed description and operation of the invention when considered with the drawings in which:

FIG. 1 is a basic block diagram representing a brake control system comprising the invention, FIG. 2 is a more detailed circuit diagrammatic of the brake control system of FIG. 1, and FIG. 3 is a series of signal plots indicating pressure levels versus time at the outputs of the elements comprising a timing control portion of the brake control system.

Referring now to FIG. 1 of the drawings, a block diagram of a brake control system is shown for application on a railway vehicle designated as car B, which is dispersed in a train having additional cars, such as car A adjoining one end of car B and a car C adjoining the opposite end of car B, each additional car being equipped with a like brake control system. Interconnecting a relatively low fluid pressure supply through the train is a segmented signal pipe on each car. The respective segments 1 and 2 of the signal pipe are adapted for connection with the alternate signal pipe segments of the adjoining cars; i.e., signal pipe segment 1 of car B is connected to segment 2 of car A and signal pipe segment 2 of car B is connected to segment 1 of car C. Further comprising the brake control system is a fluidic signal selector circuit 3 adapted to respond to fluid pressure variation in the signal pipe segments;

a signal control circuit 4 conditioned by the signal selector circuit to reproduce the control signal effective in whichever signal pipe segment is receiving an incoming signal and to transmit the control signal via the other signal pipe segment to the signal pipe segment connected therewith of the adjoining car; a timing control circuit 5 conditioned by the signal selector circuit 3 to initiate a timing function during which time the signal selector circuit is desensitized to the signal being transmitted; a power pipe 6 connected in the usual fashion between adjoining cars for the purpose of carrying high fluid pressure to each car of the train from the conventional air supply equipment (not shown); a storage reservoir 7 charged with fluid pressure carried in power pipe 6 to provide a local source of air supply on each car; a differential sensor circuit 8 interconnected between pipe 6 and reservoir 7 to detect a brake or rupture in pipe 6 and to provide a local emergency signal at each car, thereby providing a fail-safe break-in-two protection feature; a fluidic brake control circuit 9 for effecting control of the car brakes in response to the analog control signal produced by signal control circuit 4 or the digital emergency signal provided by circuit 8; a pressure regulator 10 for maintaining a well regulated pressure supply consistent with the low pressure power requirements of the fluidic components comprising the systems; and such other ancillary system components as check valves, chokes, volumes, etc. as are deemed necessary for proper operation.

Referring now to FIG. 2, let it be assumed that car B is oriented in the train so that signal pipe segment 1 is the forward facing signal pipe segment and consequently signal pipe segment 2 is the rearward facing signal pipe segment. Let it also be assumed that relatively low fluid pressure consistent with operation of pure fluid components is carried in signal pipe segments 1 and 2, being subject to variation in accordance with manipulation of an operator's pressure regulating valve device (not shown) or by operation of other suitable means for controlling variation of fluid pressure therein. Signal pipe segment 1 is connected to a signal recognition network 11 of signal selector circuit 3 and to a port connection 12 of a directional interlock device 13 in signal control circuit 4. Similarly, signal pipe segment 2 is connected to a signal recognition network 14 of signal selector circuit 3 and to a port connection 15 of directional interlock device 13. Interlock device 13 may be any suitable, two position, four connection, fluidic pressure piloted device as represented diagrammatically. Supply of fluid pressure to a pilot port connection 16, as hereinafter explained, positions device 13 to effect the flow communication represented in the right-hand envelope of the valve diagrammatic, in which position the valve is shown; while supply of fluid pressure to a pilot port connection 17 positions the valve device to effect the flow communication represented in the left-hand envelope.

Recognition networks 11 and 14 are identical, each comprising a pair of pure fluid Schmitt Trigger circuits 18 and 19, a pure fluid OR/NOR element 20 and a pure fluid NOR element 21. Schmitt Triggers 18 and 19 are arranged to respond to either an increase or decrease of signal pressure carried in the respective signal pipe segments 1 and 2. Being a common fluidic component, the Schmitt Triggers in the present invention are simply shown in diagrammatic form, but are actually constructed of a plurality of cascaded pure fluid proportional amplifiers connected by way of a pure fluid flip-flop element to an output pure fluid OR/NOR element. Due to the amplifying action of its circuit, the Schmitt Trigger is easily switched in response to a slight pressure differential between its inputs, making it ideally suited for sensing changing pressure levels in the signal pipe segments, as hereinafter explained. In addition to being characterized by its extreme sensitivity in switching to an "ON" condition in accordance with a slight control pressure differential being established, the Schmitt Trigger exhibits the inherent ability to automatically reset, that is, to return to a normal "OFF" of preferred condition when the differential across its control ports is equalized without the differential actually being reversed.

A common R-C type signal delay network comprising a choke 22 and a volume 23 associated with input ports 24 of each Schmitt Trigger 18 and 19 delays the build up of signal pressure at inputs 24 relative to the build up of signal pressure effective at opposing inputs 25, by way of chokes 26, for a short duration when a pressure increase is instigated in the signal pipe segment to which the Schmitt Trigger pair is connected. In consequence of such signal pressure increase, output 27 of Schmitt Trigger 18 is momentarily pressurized due to a predominant signal pressure being established at input 25 thereof while the corresponding predominant signal pressure established at inputs 25 of Schmitt Trigger 19 maintains its output 27 depressurized. On the other hand, a decrease in signal pipe pressure is reflected at inputs 25 of the Schmitt Triggers 18 and 19 prior to being effective at inputs 24 thereof so that the predominant signal pressure is effective at inputs 24. Consequently, output 27 of Schmitt Trigger 19 is pressurized while Schmitt Trigger 18 is maintained in its normal or preferred state in which its output 27 is depressurized. It will be apparent now that variation of fluid pressure in signal pipe segment 1 or 2 in either sense, i.e., an increase or decrease of signal pipe pressure, will result in one of the Schmitt Triggers thereof being switched to a condition in which its output 27 is momentarily pressurized, becoming depressurized immediately upon expiration of the R-C time delay imposed by the time constant of choke 22 and volume 23 comprising the delay network. Expiration of the time delay restores pressure equalization across the Schmitt Trigger inputs, thereby assuring that the Schmitt Trigger resets by reason of its inherent propensity for returning to a "preferred" state under such conditions.

OR/NOR element 20 in each recognition network 11 and 14 is provided with an input 28 connected to output 27 of Schmitt Trigger 18 and an input 29 connected to output 27 of Schmitt Trigger 19. A NOR output 30 of OR/NOR element 20 is depressurized and its OR output 31 is pressurized in consequence of pressurization of either input 28 or 29, depending upon which Schmitt Trigger 18 or 19 is activated by variation of signal pipe pressure.

NOR element 21 in each recognition network 11 and 14 is provided with a pair of inputs 32 and 33 and a NOR output 34 which is pressurized in response to depressurization of both inputs and depressurized in response to pressurization of either input 32 or 33. Input 32 of each element 21 is connected to output 30 of OR/NOR element 20 in the same recognition network while input 33 is cross-connected to output 31 of OR/NOR element 20 in the other recognition network.

If it is now assumed that a change in signal pressure in signal pipe segment 1 occurs prior to a signal pressure change occurring in signal pipe segment 2, the Schmitt Trigger pair 18, 19 in recognition network 11 will respond, as previously explained, to pressurize either input 28 or input 29 of OR/NOR element 20 depending upon whether the signal pressure is increasing or decreasing in amplitude. This results in OR output 31 being pressurized to initiate a timing function, as provided by timing control circuit 5 for a purpose, as hereinafter explained. In accordance with pressurization of OR output 31, NOR output 30 is consequently depressurized, thereby removing the control signal from input 32 of element 21 in recognition network 11. Since recognition network 14 is initially inactive by reason of the fact that no signal change was assumed to occur in signal pipe segment 2, OR output 31 of element 20 thereof is depressurized whereby the control signal at input 33 of element 21 in recognition network 11 is absent. NOR output 34 of element 21 in recognition network 11 is thus pressurized, while output 34 of element 21 in recognition network 14 is depressurized by reason of its input 32 being maintained pressurized as long as recognition network 14 remains inactive.

Common to each recognition network 11 and 14 is a pure fluid flip-flop 35 in signal selector circuit 3 which provides memory of which recognition network previously responded to the signal pressure change. Input 36 of flip-flop 35 is connected to output 34 of element 21 in recognition network 11 while an opposing input 37 is connected to element 21 in recognition network 14. In response to pressurization of input 36 and depressurization of input 37 of flip-flop 35 in accordance with the effective pressure state condition of NOR elements 21 in the respective recognition networks 11 and 14, flip-flop output 38 is pressurized and output 39 is consequently depressurized. Due to the inherent bistable characteristic of a flip-flop, as is commonly understood, the pressure state condition of outputs 38 and 39 is maintained, even after the recognition network 11 resets when the previously activated Schmitt Trigger 18 or 19 returns to its preferred state, as previously explained. Memory of the fact that recognition network 11 had responded and that signal pipe segment 1 is selected as the "controlling" signal pipe segment is thus accomplished, which condition can only be changed by reversing the pressure state condition of flip-flop inputs 36 and 37, as will hereinafter be explained.

It is of interest to note at this point that NOR elements 21 in the respective recognition networks simply provide a redundant stage which, in order to produce an input at flip-flop 35, requires that, in addition to a signal indicating that one of the recognition networks has been enabled, also requires that a second signal be provided as an indication that the other recognition network has not been enabled. The connected output of each element 21 is selected so that in the event recognition networks 11 and 14 are enabled concurrently, which is considered false logic, the connected outputs are deenergized, thus leaving flip-flop 34 in its previous pressure state condition.

Pressurized output 38 of flip-flop 35 is connected to pilot port 16 of interlock valve 13 while depressurized output 39 is connected to pilot port 17. This results in interlock 13 being positioned, as shown, in which position fluid pressure in signal pipe segment 1 and effective at interlock port connection 12 is connected via a delivery port connection 40 at interlock valve 13 to a control input 41 of a pure fluid, load insensitive, proportional amplifier 42 in signal control circuit 4. An opposing input 43 of proportional amplifier 42 is provided with a bias pressure signal adapted to counteract the analog signal effective at input 41. The proportional amplifier operates in a conventional manner to divide supply pressure between a pair of outputs 44 and 45 in proportion with the pressure differential between inputs 41 and 43. As a pressure differential is developed across the amplifier inputs due to pressure at input 41 increasing to a level above bias pressure at opposing input 43, signal pressure at output 44 is proportionally increased while signal pressure at output 45 is proportionally decreased. Conversely, a pressure differential between the amplifier inputs due to signal pressure at input 41 decreasing below bias pressure at opposing input 43 results in signal pressure at output 44 decreasing and signal pressure at output 45 increasing by proportional amounts. Output 44 of amplifier 42 is connected to a return port connection 46 of the interlock valve and thence to port connection 15 leading to signal pipe segment 2.

It will be apparent now that interlock valve 13 is positioned in accordance with variation of fluid pressure in signal pipe segment 1 to connect the fluid pressure therein to input 41 of amplifier 42, output 44 of which is varied as a direct function of input 41 so as to vary fluid pressure in signal pipe segment 2 in accordance with fluid pressure variation in signal pipe segment 1. In this manner, the brake control signal is transmitted to signal pipe segment 1 of the next car C and is, in like manner, rapidly propagated through the train for establishing uniform brake forces on each car through the action of brake control circuit 9, which may be briefly described as a proportioning type fluidic brake control circuit in which control of the brake forces is provided in accordance with the degree of signal pressure developed at amplifier output 45 to which the brake control circuit is connected. It may be worthy of mention at this point that the fluid pressure signal effective at amplifier output 44 may also be utilized to control brake control circuit 9 instead of the signal at output 45 whereby a brake application would result in consequence of a control signal occurring in the opposite sense as when output 45 is utilized. In either case, the ability of the brake control system to function as described is not predicated on any specific type brake control circuit; however, details of one such exemplary circuit may be found in my copending U.S. Pat. application, Ser. No. 32,646 in which is disclosed a fluidic proportioning type brake control circuit adapted to regulate and maintain brake application pressure, as supplied by reservoir 7 in accordance with variation of an analog brake control signal, such as is obtained from amplifier output 45.

Since the Schmitt Trigger pair 18 and 19 in signal recognition network 14 is adapted to sense fluid pressure variation in signal pipe segment 2 similar to the manner in which the Schmitt Trigger pair in recognition network 11 respond to signal variations in signal pipe segment 1, means is provided to assure that NOR element 20 in recognition network 14 is disabled for a duration sufficient to complete signal transmission to car C via signal pipe segment 2 of car B. In so doing, pressure variation in signal pipe segment 2 is prevented from inadvertently reversing the stable pressure state condition of flip-flop 35, which is set in accordance with variation of signal pressure in signal pipe segment 1. The desire to maintain the flip-flop 35 in its previous pressure state condition is borne by the fact that subsequent signals are most likely to occur in the signal pipe segment in which the previous signal occurred, in the present case signal pipe segment 1. With flip-flop 35 and consequently interlock 13 already positioned, as shown and above explained, it will be apparent that subsequent signals in the signal pipe segment 1 will be immediately reflected at control input 41 of amplifier 42 for transmission of the locally reproduced control signal via signal pipe segment 2 without delay.

Now in order to desensitize recognition network 14 to the signal pressure variation in signal pipe segment 2 when signal pipe segment 1 is selected as the controlling signal pipe, a pure fluid flip-flop element 47 having opposing inputs 48 and 49 connected with the respective outputs 38 and 39 of flip-flop 35 is conditioned to assume a stable pressure state condition in which an output 50 thereof is pressurized in response to pressurization of input 48 by pressurized flip-flop output 38. Each OR/NOR element 20 in the respective recognition networks 11 and 14 is provided with an input 51 which opposes inputs 28 and 29 thereof. Being connected to flip-flop output 50, input 51 of element 20 in recognition network 16 is pressurized, provided flip-flop 47 is activated by reason of fluidic pressure being connected to its supply port 52 under control of circuit 5, as hereinafter explained. Pressurization of input 51 of OR/NOR element 20 in recognition network 14 causes element 20 to be switched to its preferred state, even when one of its opposing inputs 28 or 29 is pressurized by reason of one of the Schmitt Trigger pair responding to variation of pressure in signal pipe segment 2. Output 30 of element 20 and consequently input 32 of OR/NOR element 21 of recognition network 14 becomes pressurized to maintain element 21 in a disabled condition in which output 34 thereof is depressurized and recognition network 16 is consequently desensitized to control signals effective in signal pipe segment 2. Concurrent with pressurization of flip-flop output 50, output 53 is depressurized and being connected to input 51 of element 20 in recognition network 11, allows the pressure state condition of element 20 thereof to be determined in accordance with operation of the Schmitt Trigger pair in recognition network 11, irrespective of which operation, however, flip-flop 35 remains stable in the pressure state condition in which its output 38 is pressurized in accordance with signal pressure variation having initially occurred in signal pipe segment 1. Flip-flop 35 remains so set until a signal pressure change is initiated in signal pipe segment 2, as will hereinafter be explained.

Timing control circuit 5 is provided to assure that the recognition network 11 or 14, depending upon the set condition of flip-flop 47, is desensitized only for a period of time sufficient to permit completion of the outgoing signal in the "controlled" signal pipe segment, after which the desensitized recognition network automatically resets to a sensing condition. The timing function is initiated through an OR element 54 having an input 55 pressurized by output 31 of element 20 in recognition network 11 and an input 56 pressurized by output 31 of element 20 in recognition network 14. Pressurization of either input 55 or 56, depending upon the signal pipe segment sensed as the "controlling" signal pipe, results in pressurization of OR output 57. This input condition, i.e., the duration signal pressure at output 31 of recognition network 11 is present in accordance with signal pressure variation occurring in signal pipe segment 1, as is the assumed condition, is indicated by the waveform plot (a) of FIG. 3.

Due to the fact that the Schmitt Trigger pair 18 and 19 in recognition network 11 resets to a preferred condition, as previously explained, in which their connected outputs 27 are each depressurized subsequent to expiration of a short time delay following termination of the signal pressure change in the "controlling" signal pipe segment, the timing circuit is provided with a pure fluid flip-flop 58 to provide memory of the timing function being initiated after the recognition network 11 resets, thereby assuring at least a predetermined duration that recognition network 14 is disabled, as will hereinafter be apparent. Flip-flop 58 is provided with an input 59 which when pressurized by output 57 sets flip-flop 58 in a stable pressure state condition in which its output 60 is pressurized, consequently resulting in depressurization of its other output 61. Waveform plot (b) in FIG. 3 corresponds to output 61 which is indicated as dropping in amplitude in accordance with the positive going transition of waveform (a). Depressurization of output 61 removes the signal at input 62 of NOR element 63 which allows the NOR element to assume its preferred state in which its output 64 is pressurized to provide supply pressure to the power supply port 52 of flip-flop 47, for a purpose as hereinbefore explained.

Pressurized output 60 of flip-flop 58 is connected in parallel to input 65 of a pure fluid OR element 66 and to a signal delay network comprising a choke 67 and a volume 68. The pressure build up at input 65 follows the charging curve of the R-C time constant of choke 67 and volume 68, as indicated in waveform plot (c). When fluid pressure at input 65 builds up to the switching level of element 66, output 69 becomes pressurized, as indicated by waveform plot (d). Output 69 is connected to an input 70 of NOR element 63 and to an input 71 of flip-flop 58. Signal pressure at input 70 serves to reinforce the preferred state of NOR element 63, in which preferred state output 64 remains pressurized to maintain the pressure supply at input 52 of flip-flop 47 which is thereby maintained in an active condition to disable recognition network 14, as previously explained.

Concurrent pressurization of input 71 of flip-flop 58 results in its being switched to its original stable state condition in which its output 61 and consequently input 62 of NOR element 63 becomes pressurized, provided of course input 59 of flip-flop 58 is depressurized by reason of the signal pressure change in the "controlling" signal pipe segment having terminated. In FIG. 3 it is seen that a relatively long signal at plot (a) withholds development of the pressure signal in plot (b), even though a signal is present in plot (d), until the signal at (a) disappears when the controlling signal pipe pressure change terminates. It will be noted, however, that the presence of input 62 will not switch NOR element 63 due to pressurization of the opposing input 70 which remains pressurized until the time delay network allows element 66 to reset.

Since the blowdown of pressure in volume 68 cannot begin until flip-flop 58 resets to its original state in which its output 60 is depressurized, and flip-flop 58 cannot reset until the signal pressure change occurring in the "controlling" signal pipe segment is terminated, it will be apparent that the time delay network comprised of choke 67 and volume 68 will maintain output 69 of element 66 pressurized a predetermined duration until the pressure level effective at input 65 drops below the switching point of element 66. This time delay holds the signal at input 70 of NOR element 63 to counteract the signal at input 62 when flip-flop 58 is reset. Pressurization of power supply to port 52 of flip-flop 47 is thus maintained whereby the recognition network 16 is disabled for a period corresponding to the level of pressure to which volume 68 was charged during the period of signal pressure change, thus providing sufficient time to complete signal transmission via "controlled" signal pipe segment 2. Should the duration of signal pressure change in the "controlling" signal pipe segment be relatively short, such that flip-flop input 59 is absent when input 71 is established, the flip-flop will be reset before volume 68 is fully charged so that the time delay during which the recognition network is disabled is shortened to a predetermined minimum period determined by the value of the R-C network and the switching point of OR element 66.

When the change of pressure level in signal pipe segment 1 is finally terminated and flip-flop 58 is reset, fluid pressure stored in volume 68 is dissipated via choke 67 and depressurized output 60 at a rate determined by the R-C time constant of the delay network, as illustrated in waveform plot (c). When the pressure at input 65 dissipates below the switching point of element 66, output 69 becomes depressurized, consequently depressurizing input 71 of flip-flop 58 and input 70 of element 63, which is thereby conditioned to be switched by the existing pressure at input 62 to remove the power supply from flip-flop 47, which is accordingly caused to assume a passive condition in which its outputs 50 and 53 are depressurized. By reason of its bistable characteristic, flip-flop 58 remains in a reset condition in which its output 61 is pressurized until set by a subsequent signal pressure change in one of the signal pipe segments to initiate another timing function.

Depressurization of input 51 of element 20 in recognition network 14, by reason of flip-flop 47 having its power supply removed, restores the recognition network to an active condition in which it is adapted to respond to signal pressure changes occurring in signal pipe segment 2, as sensed by the Schmitt Trigger pair 18 and 19 thereof. Element 20 of recognition network 14 responds to an output from either Schmitt Trigger to depressurize input 32 of element 21 in recognition network 16 and to presurize input 33 of element 21 in recognition network 11 when a signal pressure change is assumed to occur in signal pipe segment 2. Input 37 of flip-flop 35 is consequently pressurized while input 36 is depressurized, thus causing flip-flop 35 to switch from its previous set condition, as established by the signal pressure change sensed in signal pipe segment 1, to a pressure state condition in which its output 39 and consequently pilot port 17 of directional interlock 13 is pressurized. Corresponding depressurization of flip-flop output 38 and consequently pilot port 16 results in the interlock valve being shifted to a position, as indicated in the left-hand envelope of the valve symbol, in which port connection 15 is connected to delivery port 40 and return port 46 is connected to port connection 12.

At the same time, pressurized output 39 of flip-flop 35 pressurizes input 49 of flip-flop 47 while opposing input 48 is depressurized in accordance with output 38 of flip-flop 35 being depressurized. This establishes a pressure state condition across the inputs of flip-flop 35 whereby the flip-flop is conditioned to pressurize its output 53 to disable recognition network 11. As previously explained, the timing control circuit 5 functions incident to response of either recognition network to a signal pressure change occurring in one of the signal pipe segments to provide a supply of fluid pressure to power supply port 52 of flip-flop 47 which is thus restored from a passive to an active condition.

Concurrently with desensitization of recognition network 11, fluid pressure variation in signal pipe segment 2 is connected via ports 15 and 40 of the interlock valve to input 41 of the proportional amplifier 42 one output of which is connected via interlock valve ports 46 and 12 to signal pipe segment 1 whereby the fluid pressure therein is caused to change in amplitude in accordance with signal variation in signal pipe segment 2.

While amplifier output 44 is varying as a direct function of input 41, complimentary output 45, which controls the degree of brake application through brake control circuit 9, as hereinbefore explained, varies as an inverse function of amplifier input 41. It will therefore be apparent that accidental loss of signal pipe pressure, such as may occur due to a rupture in the signal pipe or a separation of the pipe by reason of a train break-in-two, will result in a corresponding increase in amplifier output 45 sufficient to cause brake control circuit 9 to produce a maximum brake application which, under the circumstances, may be considered an emergency brake application.

If it is assumed, for example, that the train break-in-two or signal pipe rupture occurs at signal pipe segment 1 of car B and that interlock 13 is positioned in accordance with signal pipe segment 1 having been previously selected as the "controlling" signal pipe segment, it will be apparent that amplifier 42 will reproduce the signal loss in signal pipe segment 2 for transmission of the emergency signal to signal pipe segment 1 of car C and so forth through the train in the direction of car C. At the same time, loss of signal pressure at signal pipe segment 2 of car A, by reason of being connected to signal pipe segment 1 of car B, at which point the pipe is assumed to be open to atmosphere, is sensed by the signal selector circuitry of car A and consequently transmitted to signal pipe segment 1 thereof and so forth through the train in the direction of car A. Having assumed signal pipe segment of car B as being the "controlling" signal pipe segment thereof due to the previous signal pressure change having occurred first therein incident to the signal having been transmitted from the direction of car A toward cars B and C, it will be noted that the signal selector circuitry of cars B and C will remain in their previous set condition for transmitting the signal in the original direction of signal transmission while the signal selector circuitry of car A is reset to a condition opposite its previous set condition in order to transmit the signal from car B toward car A so that the emergency signal is propagated in opposite directions from the point of rupture or break-in-two.

In a similar manner, if signal pipe segment 2 of car B is selected as the "controlling" signal pipe segment, indicating that the direction of signal transmission had previously been from car C toward car A, then the emergency signal is transmitted in that direction without requiring the signal selector circuitry of car A to be reset. In order to transmit the emergency signal in the opposite direction however, the signal selector circuitry of car B will respond to a change of signal pressure occurring in its previously "controlled" signal pipe segment 1 and will reset accordingly to transmit the signal in the opposite direction.

Since it is likely that power pipe 6 will also be separated, especially under conditions of a break-in-two, a one-way check valve 72 is provided between power pipe 6 and reservoir 7 on each car to prevent loss of reservoir pressure by way of the open power pipe. Fluid pressure in reservoir 7 is connected via another one-way check valve 73 to brake control circuit 9 as a source of supply for providing the brake application pressure. Fluid pressure in reservoir 7 is also utilized as the source from which fluid pressure is continuously supplied to the fluidic elements in the several circuits comprising the system, being adjusted and maintained at fluidic levels by pressure regulator 10. The capacity of reservoir 7 is selected to provide the necessary air supply for braking and to maintain the fluidic control circuit components active for a duration sufficient to bring the train to a halt in the event the source of supply to the reservoir 7 is interrupted such as by a break-in-two or power pipe rupture.

In the event the power pipe 6 should rupture or separate without a corresponding rupture or separation of the signal pipe to provide an emergency signal, as hereinbefore explained, the differential sensor circuit 8 is provided to sense a drop in power pipe pressure significantly below the pressure effective in reservoir 7, whereby a digital signal is provided of sufficient amplitude to drive the brake control circuit 9 to produce a maximum brake application irrespective of the degree of application in effect in accordance with signal pipe pressure.

The differential circuit 8 comprises a pure fluid Schmitt Trigger circuit 74 which is similar to previously described Schmitt Triggers 18 and 19 in the respective signal recognition networks, and comprises opposing inputs 75 and 76 and an output 77. Input 75 is connected downstream of check valve 72 so as to be subject to fluid pressure effective in reservoir 7 while input 76 is connected to power pipe 6. Being regulated to maintain a continuous source of supply from which reservoir 7 is charged, power pipe 6 is normally of higher pressure than is effective in reservoir 6, due to the fact that the fluidic components comprising the several system circuits must continuously consume air in order to remain in an active state. Consequently, a pressure differential is established across the Schmitt Trigger inputs 75 and 76 with input 76 reflecting the predominant pressure normally effective in the power pipe to effect a pressure state condition of the Schmitt Trigger in which its connected output 77 is depressurized.

In the event power pipe pressure is significantly reduced, such as by a separation or rupture of the power pipe or by actuation of an emergency valve (not shown) which may be associated therewith, check valve 72 will prevent a corresponding reduction of reservoir pressure, thereby resulting in the pressure differential across the inputs of Schmitt Trigger 74 being reversed. Schmitt Trigger output 77 is consequently pressurized in response to input 75 reflecting the predominant pressure in reservoir 7 and is connected via a one-way check valve 78 to the input of brake control circuit 9. The Schmitt Trigger output is of sufficient amplitude to drive the brake control circuit to produce a maximum brake application, which, if desired, may be greater than the maximum brake application derived in the normal mode of control from output 45 of amplifier 42. Schmitt Trigger output 77, in addition to providing the emergency signal to brake control circuit 9, also is connected to input 43 of proportional amplifier 42 where the emergency signal supplements the bias signal thereat to counteract any signal which may be effective at amplifier input 41, thus causing amplifier output 45 to also call for maximum brake pressure which is developed in the same manner on each car as the power pipe reduction is sensed serially in opposite directions from the point of rupture or separation by differential sensors 8 at each car.

In accordance with amplifier output 45 providing maximum signal pressure, output 44 is proportionally reduced. Thus, it will be seen that the signal effective at the "controlling" signal pipe segment is overridden by the emergency signal at amplifier 42 so that the signal effective in the signal pipe segment is of no consequence.

Eventually signal pipe pressure in the respective signal pipe segments 1 and 2 will dissipate to the level of pressure effective at amplifier output 44, which is maintained at substantially zero psi. under emergency conditions so that in order to subsequently release the brake application once the train is prepared to proceed following such a break-in-two initiated brake application, it is necessary to initially recharge the power pipe 6 to regain a source of high fluid pressure for braking, to activate the fluidic control circuit components, and to reset Schmitt Trigger 74 to remove the emergency signal. Release of the brake application may then be accomplished by restoring signal pipe pressure to a value sufficient to maintain brake control circuit 9 in a release condition.

As previously mentioned, the capacity of reservoir 7 is selected to assure air supply to the brakes by way of brake control circuit 9 and to maintain a regulated flow of fluid pressure at each fluidic component by way of pressure regulator 10 for sufficient duration to bring the train to a safe stop should a rupture or separation of either the signal pipe or power pipe occur. One-way check valve 73 between the brake control circuit 9 and reservoir 7 is thus necessary to prevent brake application pressure from back flowing into the reservoir and thus blowing to atmosphere at the fluidic components.

Having now described the invention, what I claim as new and desire to secure by Letters Patent, is:

1. A control system for a railway vehicle comprising:
   a. a signal conduit via which a control signal is transmitted,
   b. signal control means separating said signal conduit into first and second segments, and including means responsive to a first conditioning signal to connect a control signal effective at said first segment to said second segment and responsive to a second conditioning signal to connect a control signal effective at said second segment to said first segment, and
   c. signal selector means responsive to said control signal in said first and second segments of said signal conduit to provide said first and second conditioning signals, respectively.

2. The system as recited in claim 1 further comprising timing control means operable in response to said control signal being first sensed at either one of said first or second segments for preventing said selector means from responding to a control signal in the other of said first or second segments at least so long as said first sensed control signal is present.

3. The system as recited in claim 1 further comprising:
   a. timing control means operable in response to said control signal being first sensed at either one of said first or second segments to provide a power supply output for at least as long as said control signal is present, and
   b. means adapted to be activated from a normally passive condition in response to said power supply output of said timing control means to prevent said signal selector means from responding to a control signal in the other one of said first and second segments subsequent to said control signal being first sensed at either one of said first and second segments.

4. The system as recited in claim 2, comprising:
   a. timing control means including means operable in response to said control signal being first sensed at either one of said first or second segments to provide a power supply output for at least as long as said control signal is present,
   b. signal selector means including:
      i. means for sensing said control signal in each of said first and second segments and providing one or the other of two output signals respectively, and
      ii. switch means for selectively providing said first and second conditioning signals in accordance with whichever one of said two output signals is present, and
   c. means adapted for activation from a normally passive condition in response to said power supply output to prevent the other one of said sensing means from providing a corresponding one of said two output signals to said switch means.

5. The system as recited in claim 1 wherein said signal control means comprises:
   a. interlock means having an input an and output, and operable in response to said first conditioning signal to connect said first segment to said output and to connect said second segment to said input, and operable in response to said second conditioning signal to connect said second segment to said output and to connect said first segment to said input, and
   b. relay means having an input connected to said output of said interlock means and having an output connected to said input of said interlock means.

6. The system as recited in claim 5 further comprising operating means connected to said output of said relay means to vary the degree of control of said vehicle.

7. The system as recited in claim 6 wherein said operating means comprises brake control means for varying the degree of brake application on said vehicle in accordance with the signal at said output of said relay means.

8. The system as recited in claim 7 wherein said relay means comprises proportional amplifier means having one control input connected with said output of said interlock means, an opposing control input for connection with a bias signal, and a pair of outputs, one of said outputs connected to said input connection of said interlock means and the other one of said outputs connected to said operating means.

9. The system as recited in claim 1 further comprising:
   a. signal control means including means for providing said control signal at an output,
   b. power supply means,
   c. a vehicle brake control circuit for connecting said power supply means to effect operation of vehicle brakes in accordance with said control signal at said output, and
   d. means for effecting operation of said brake control circuit to effect a brake application in response to loss of said power supply.

10. The system as recited in claim 9 wherein said power supply means comprises:
    a. a storage reservoir,
    b. a supply pipe for communicating said reservoir with a source of fluid pressure,
    c. said means for effecting operation of said brake control circuit comprising means for providing a brake application control signal to said brake control circuit when the pressure in said reservoir exceeds the pressure in said supply pipe by a predetermined amount.

11. The system as recited in claim 10 wherein said means providing a brake application control signal comprises a differential pressure sensor.

12. The system as recited in claim 8 further comprising:
    a. a storage reservoir,
    b. a supply pipe communicating said reservoir with a source of fluid pressure,
    c. differential sensor means having a sensor output connected to said brake control means and operable in response to a predetermined excess of fluid pressure in said reservoir relative to said supply pipe to provide a brake control signal at said sensor output, said brake control signal being at least equal to the maximum control signal effective in said segments, and
    d. means connecting said sensor output to said opposing control output to said proportional amplifier.

13. The system as recited in claim 1 wherein said signal selector means comprises:
    a. first signal recognition means having a first inhibit input and adapted to provide a first signal in response to a control signal in said first segment,
    b. second signal recognition means having a second inhibit input and adapted to provide a second signal in response to a control signal in said second segment,
    c. first memory means responsive to said first signal to provide said first conditioning signal and responsive to said second signal to provide said second conditioning signal, and
    d. flip-flop means conditioned in response to said first conditioning signal to provide a third signal at said second inhibit input to prevent said second recognition means from providing said second signal and conditioned in response to said second conditioning signal to provide a fourth signal at said first inhibit input to prevent said first recognition means from providing said first signal.

14. The system as recited in claim 13 further comprising timing control means operable in response to a control signal in either one or the other of said segments to activate said flip-flop means for at least as long as the first sensed one of said control signals is present.

15. The system as recited in claim 14 comprising:
    a. said first signal recognition means including,
       i. first signal sensing means responsive to said control signal in said first segment to provide one or the other of a pair of digital outputs dependent upon the sense of said control signal, and ii. first control means including said first inhibit input enabled in response to either one of said digital outputs of said first signal sensing means to provide said first signal, and disabled in response to said fourth signal at said first inhibit input.
b. said second signal recognition means including,
  i. second signal sensing means responsive to said control signal in said second segment to provide one or the other of a pair of digital outputs depending upon the sense of said control signal, and
  ii. second control means including said second inhibit input enabled in response to either one of said outputs of said second signal sensing means to provide said second signal, and disabled in response to said third output signal at said second inhibit input.

16. The system as recited in claim 15 wherein said first and second signal sensing means each comprise:
a. a pair of pure fluid digital switching elements, each having opposing first and second inputs subject to said control signal and an output providing one of said pair of digital outputs, said output being pressurized in a first condition in which a preponderance of fluid pressure is effective at the first input and depressurized in a second condition in which a preponderance of fluid pressure is effective at the second input, and
b. signal delay means arranged between the respective one of said segments and said first input of one of said pair of switching elements and said second input of the other of said pair of switching elements to modify the rate of signal pressure change thereat whereby said first condition of one of said pair of switching elements and said second condition of the other of said pair of switching elements is effective consequent to increase of fluid pressure in the respective segment and said second condition of the one of said switching elements and the said one condition of the other of said switching elements is effective consequent to decrease of fluid pressure in the respective segment.

17. The system as recited in claim 16 wherein each of said first and second control means comprises;
a. a pure fluid OR/NOR element having a pair of inputs for connection with the outputs of said pair of pure fluid digital switching elements, an OR output and a NOR output, and
b. a pure fluid NOR element having one input for connection with said NOR output of said OR/NOR element and another input for connection with said OR output of the other one of said first and second control means and a NOR output pressurized when the inputs of said NOR element are each depressurized to provide the corresponding one of said first and second signals.

18. The system as recited in claim 17 wherein said OR/NOR element of said first control means includes said first inherent input subject to said fourth signal to pressurize said NOR output irrespective of the pressure state of said pair of inputs of said OR/NOR element of said first control means to disable said NOR element of said first control means, and wherein said OR/NOR element of said second control means includes said second inherent input subject to said third signal to pressurize said NOR output irrespective of the pressure state of said pair of inputs of said OR/NOR element of said second control means to disable said NOR element of said second control means.

19. The system as recited in claim 3 wherein said timing control means comprises:
a. first logic means having a control input, an opposing input and a NOR output providing said power supply output,
b. flip-flop means having opposing inputs, a first output connected to said control input of said first logic means and a second output provided in consequence of said control signal,
c. second logic means having a control input connected to said second output of said flip-flop means and an OR output providing a signal for connection with one of said opposing inputs of said flip-flop means to provide a signal at said first output of said flip-flop and with said opposing input of said first logic means, and
d. signal delay means subject to said second output of said flip-flop means to maintain a signal at the control input of said second logic means at least a predetermined duration following termination of said second output of said flip-flop.

* * * * *